July 3, 1928. 1,676,221
J. H. SEYMOUR ET AL
THRUST BEARING
Filed July 18, 1927   2 Sheets-Sheet 2
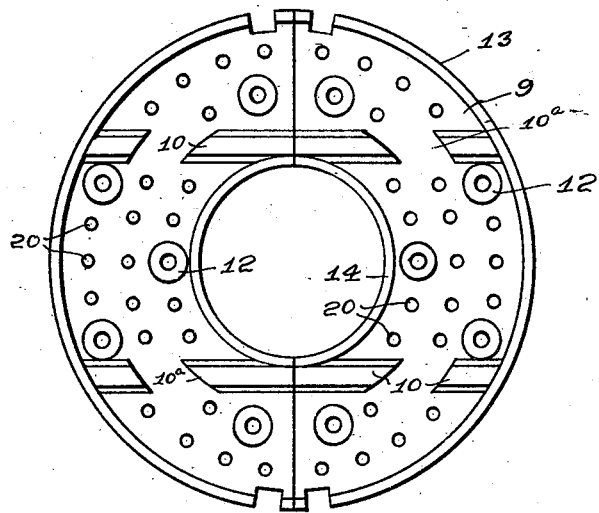
Fig. 3.
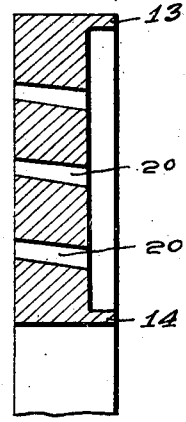
Fig. 5.
Fig. 6.
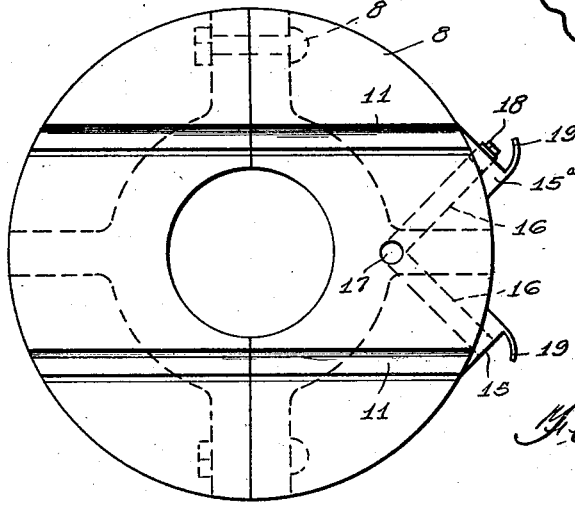
Fig. 4.
Inventor
J. H. Seymour and
Thomas S. Spear,
By Samuel Herrick,
Attorney Patented July 3, 1928.

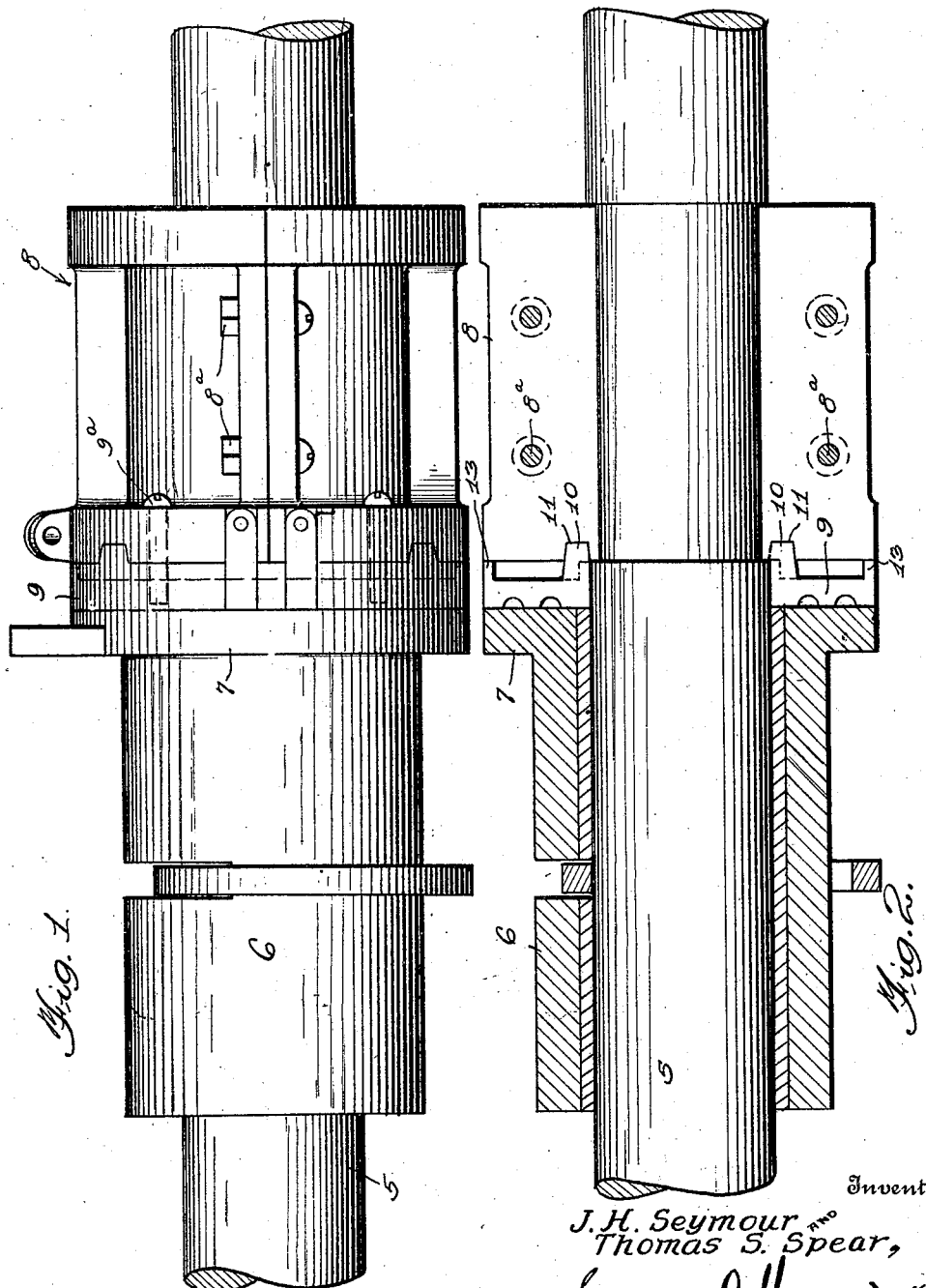

1,676,221

UNITED STATES PATENT OFFICE.

JULIUS H. SEYMOUR AND THOMAS S. SPEAR, OF BARTOW, FLORIDA; SAID SEYMOUR ASSIGNOR TO SAID SPEAR.

THRUST BEARING.

Application filed July 18, 1927. Serial No. 206,617.

This invention relates to thrust bearings of the character of that shown in our co-pending application, Serial Number 125,693. The primary object of the invention is to provide improved means for freely supplying lubricating oil to the contact surfaces of said thrust bearings, and to secure this result by so arranging the parts as to impart a force feed to the oil under the action of the rotation of the shaft and abutment carrying the wear-plate, hereinafter described.

Further objects and advantages of the invention will be set forth in the detailed description which follows:

In the accompanying drawings:

Fig. 1 is a side elevation of a thrust bearing constructed in accordance with the invention, Fig. 2 is a longitudinal sectional view thereof, Fig. 3 is a rear elevation of a wear-plate, hereinafter described, Fig. 4 is an end elevation of an abutment secured to and rotating with the shaft, Fig. 5 is a fragmentary vertical sectional view of the wear-plate, and Fig. 6 is a detail view of a portion of said wear-plate illustrating one of the oil ports hereinafter described.

Like numerals designate corresponding parts in all of the figures of the drawing.

While it is comparatively easy to lubricate a vertical shaft, and the thrust bearings carried thereby, under the influence of gravity, difficulty has been experienced in properly lubricating the thrust bearings of horizontal shafts, because the oil tends to move, by gravity, away from the bearings. The device of the present invention is so arranged that the rotation of the shaft in an oil bath picks up the oil and thrusts it, substantially horizontally, through the wear-plate of the bearing and to the working face thereof.

In the drawings, 5 designates the shaft, and 6 a fixed bearing element, in which said shaft turns, these features being illustrated in the applications previously filed by us. This bearing element may, if desired, be associated with an oil bath in which oil may be maintained up to a desired level as is common in many mechanical devices.

The rotative shaft 5 has a two-part abutment 8 clamped thereon by bolts or other suitable fastening devices 8ª. A two-part wear-plate 9 is secured to the abutment 8 by screws, or like fastening devices 9ª. Ribs 10 extend across the rear face of the wear-plate and enter two correspondingly shaped channels 11 formed in the face of the abutment so that the wear-plate and the abutment are tied together. The rear face of the wear-plate and the front face of the abutment lie in spaced relation to each other, due to the presence of the ribs 10 and lugs 12. The outer and inner edges of the rear face of the wear-plate are shrouded, as indicated at 13 and 14, by rearwardly directed flanges which project to, and contact with, the front face of the abutment. Thus the escape of oil from the space between the wear-plate and abutment under the action of centrifugal force, is prevented. To get the oil into the space referred to we provide upon the abutment 8, two pick-up cups or projections 15 and 15ª. Ports 16 lead through these abutments and communicate with a horizontal port 17 which discharges into the space between the wear-plate and the abutment. When in use, one or the other of the pick-up projections has its port closed by a plug 18. It depends upon the direction of rotation of the bearings which of these ports will be closed. If desired, we may add pick-up tongues 19 to the pick-up projections to accentuate the pick-up action.

To facilitate the free passage of the oil from one part of the space to the other the ribs 10 are cut to provide passages 10ª for said oil.

It is to be understood that the invention is not limited to the precise construction set forth, but that it includes within its purview whatever changes fairly come within either the terms or spirit of the appended claims.

Having described our invention, what we claim is:

1. A thrust bearing, a rotative shaft and abutment carried thereby, a wear-plate secured to, and rotating with, the abutment, means for spacing the wear-plate from the abutment, shrouds for closing the space between the wear-plate and the abutment at both the inner and outer edges of said wear-plate, pick-up projections disposed at an angle to pick up oil during the rotation of the wear-plate and abutment, and means for conducting oil from said pick-up projections to the space between the wear-plate and abutment, said wear-plate having ports formed therethrough from its rear to its front face.

2. In combination a thrust bearing, a rotative shaft and abutment carried thereby, a wear-plate secured to and rotating with the abutment, shrouds for closing the space between the wear-plate and abutment at both the inner and outer edges of said wear-plate, means for conducting oil from the periphery of the abutment to the space between the wear-plate and the abutment, said wear-plate having ports formed therethrough from its rear to its front face, and pick-up projections for directing oil into the oil conducting means, the space between the wear-plate and the abutment being a closed one, except for said ports and oil-conducting means, whereby oil entering through the oil-conducting means is forced to escape through said ports.

3. A device of the character described, comprising a horizontally disposed rotative shaft, an abutment carried thereby, a wear-plate secured to the abutment and rotating therewith, and lying in spaced relation thereto, said wear-plate having ports formed therethrough from its rear face to its front face, means for closing the space between the wear-plate and the abutment at both the inner and outer periphery of the wear-plate, and a pair of pick-up projections facing in opposite directions, there being ports leading from said projections to the space between the wear-plate and the abutment, and means for closing the entrance to the port of one of said projections.

4. A device of the character described, comprising a horizontally disposed rotative shaft, an abutment carried thereby, a wear-plate secured to the abutment and rotating therewith, and lying in spaced relation thereto, said wear-plate having ports formed therethrough from its rear face to its front face, means for closing the space between the wear-plate and the abutment at both the inner and outer periphery of the wear-plate, a pick-up projection disposed upon the periphery of the abutment and facing in the direction of rotation of the abutment and wear-plate, there being a port leading from said projection to the space between the wear-plate and the abutment, so that oil will be positively fed to said space under the rotative action of the abutment.

In testimony whereof they affix their signatures.

JULIUS H. SEYMOUR.
THOMAS S. SPEAR.